United States Patent [19]

Evans et al.

[11] 3,950,641

[45] Apr. 13, 1976

[54] METHODS OF MASS SPECTROMETRY AND MASS SPECTROMETERS

[75] Inventors: Sydney Evans, Sale; Thomas Oliver Merren, Hale, both of England

[73] Assignee: Associated Electrical Industries Limited, London, England

[22] Filed: Dec. 31, 1974

[21] Appl. No.: 537,777

Related U.S. Application Data

[63] Continuation of Ser. No. 254,938, May 19, 1972, abandoned.

[30] Foreign Application Priority Data

May 21, 1971 United Kingdom .............. 16415/71

[52] U.S. Cl. ................. 250/283; 250/296; 250/298

[51] Int. Cl.² .................... H01J 39/34; B01D 59/44

[58] Field of Search ........... 250/281, 282, 283, 284, 250/294, 295, 296, 298, 299, 423, 424, 427

[56] References Cited

UNITED STATES PATENTS

| | | | |
|---|---|---|---|
| 3,405,263 | 10/1968 | Wanless | 250/285 |
| 3,479,504 | 11/1969 | Hull | 250/300 |
| 3,515,869 | 6/1970 | Sherman | 250/283 |
| 3,573,453 | 4/1971 | Powers | 250/284 |

FOREIGN PATENTS OR APPLICATIONS

| | | | |
|---|---|---|---|
| 1,161,432 | 8/1969 | United Kingdom | 250/281 |
| 1,171,700 | 11/1969 | United Kingdom | 250/281 |
| 1,147,651 | 4/1969 | United Kingdom | 250/281 |

*Primary Examiner*—Craig E. Church

[57] ABSTRACT

Ions are formed from an unknown substance in a first ion source of a double beam mass spectrometer and accelerated therefrom at a low accelerating voltage, e.g. 1kV or 2kV. Ions are formed from a reference substance in the second ion source and accelerated therefrom at a relatively high accelerating voltage, e.g. 8kV. The ion beams so formed pass through a common magnetic analyser to produce respective mass spectra. With pefluorokerosene as a reference substance producing a reference mass scale up to about 1000a.m.u., the mass spectrum of the unknown substance can be accurately calibrated (mass marked) up to 8000a.m.u. or 4000a.m.u. (with the above examplary low accelerating voltages). Thus the invention enables the inherently very accurate chemical mass marking ability of a double-beam mass spectrometer to be scaled up along the mass scale of the unknown substance.

36 Claims, 4 Drawing Figures

METHODS OF MASS SPECTROMETRY AND MASS SPECTROMETERS

This is a continuation of application Ser. No. 254,938 filed May 19, 1972, now abandoned.

CROSS REFERENCE TO RELATED PATENT

"Plural Beam Mass Spectrometer for Conducting High and Low Resolution Studies", U.S. Pat. No. 3573453, issued Apr. 6, 1971 to Patrick Powers, and assigned to the assignee of the present invention.

This invention relates to methods of mass spectrometry, and mass spectrometers.

It is an object of the invention to provide an improved method of mass spectrometry, and an improved mass spectrometer.

In the art of mass spectrometry, there exists the requirement of accurate mass marking, that is, the accurate calibration of the mass scale of the results of a mass spectrometric analysis. A good method of mass marking is simultaneously to analyse a reference substance in a mass spectrometer along with the sample substance. The reference substance, such as perfluorokerosene, produces peaks at a plurality of mass numbers, thereby produced by the sample may be interpolated.

According to an aspect of the invention, a method of mass spectrometry comprises the steps of forming ions from a substance to be analysed in a first ion source and accelerating the ions therefrom at a first accelerating voltage to form a first ion beam, forming ions from a reference substance in a second ion source and accelerating the ions therefrom at a second accelerating voltage substantially different from the first accelerating voltage, to form a second ion beam, directing the first and second ion beams into a magnetic analyser having a varying magnetic field thereby to deflect the ions in both the beams according to their mass to charge ratios, simultaneously collecting deflected ions from the respective beams which have passed through the analyser and which have mass to charge ratios which are related to the respective accelerating voltages and the instantaneous strength of the magnetic field during their deflection, and producing a first mass spectrum of the substance to be analysed and a second mass spectrum of the reference substance, the first and second mass spectra having substantially different mass scales which are correlated and in inverse relationship to the first and second accelerating potentials, whereby to provide accurate chemical mass marking of the first mass spectrum by the second mass spectrum.

Preferably, one of the accelerating voltages is at least twice the other accelerating voltage Preferably the second accelerating voltage is substantially greater than the first accelerating voltage whereby the mass scale of the first mass spectrum is substantially greater than the mass scale of the second mass spectrum.

As a further step, the first ion beam, but not the second ion beam, may be electrostatically analysed before passing through the the magnetic field.

The ion beams may be directed along a common path immediately before entering the magnetic field, the deflected ions bein collected by a single ion collector means capable of producing an output representative of collected ions below a predetermined and controllably variable energy level, and switching the collector means between a first level above the energy level of ions accelerated by the higher of the accelerating voltages and a second level below the energy level of ions accelerated by the higher of the accelerating voltages but above the energy level of ions accelerated by the lower of the accelerating voltages, the switching being performed at a substantially greater rate than the rate of variation of the magnetic field, whereby the output of the collector means at the first level is repesentative of the first and second mass spectra superimposed, and the output at the second level is representative of the mass spectrum of ions accelerated by the lower of the accelerating voltages. The output at the second level may be subtracted from the output at the first level to provide the mass spectrum of the ions accelerated by the higher of the accelerating voltages.

If the steps of the two preceding sentences were applied where the higher accelerating voltage was 8 kv, the collector means could be switching between 8050 volts and 7950 volts. It is envisaged that a difference in energy levels corresponding approximately to only 0.7% of the higher of the two accelerating voltages could be required, despite the very high energy differences between ions from the two beams.

According to another aspect of the invention, a mass spectrometer has a magnetic analyser which has a variable magnetic field and which is disposed in the ion paths between first and second ion sources on the one hand and ion collector means on the other hand. A direct current power supply is arranged to supply substantially different ion accelerating voltages to the first and second ion sources. The arrangement is such that, during use, ions from samples ionised by the first and second sources contemporaneously enter the magnetic analyser with substantially different energies so that the ion collector is able to receive ions of substantially different mass to charge ratio simultaneously from the first and second ion sources. The different ratios for any particular value of the analyser's magnetic field are in known relationship depending on the different accelerating voltages.

Embodiments of the invention will now be described by way of example, with reference to the accompanying drawings wherein FIG. 1 is a schematic plan of the ion beam geometry of a mass spectrometer in accordance with the invention, and of the means producing the geometry;

Figure 1:
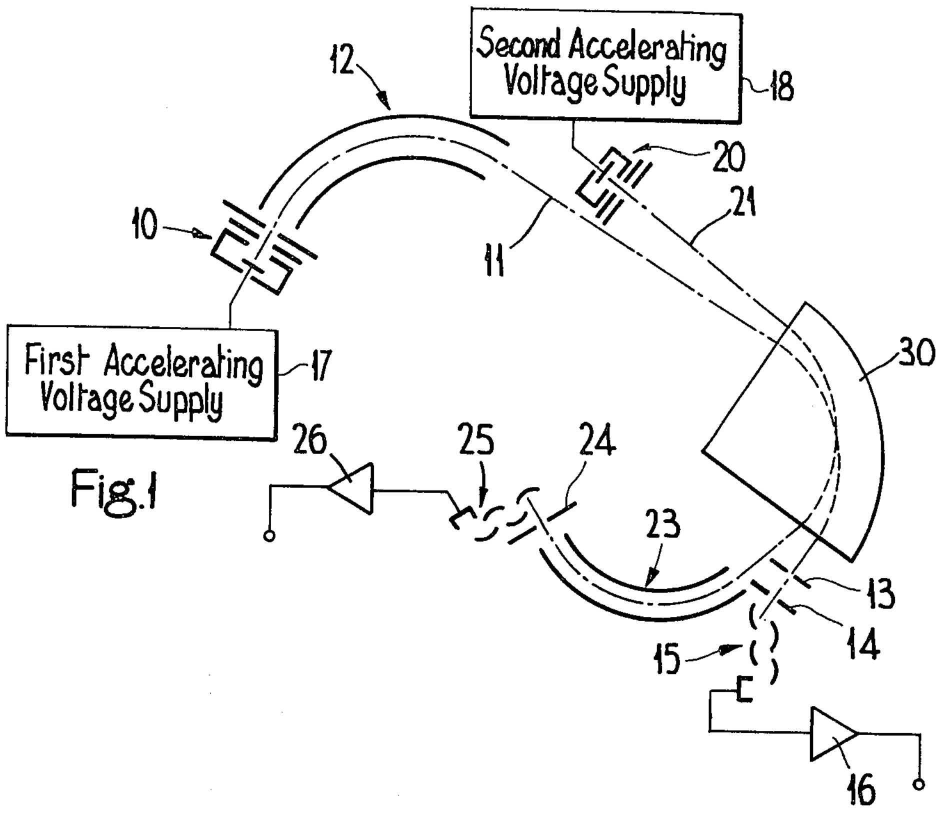

Referring first to FIG. 1, a mass spectrometer in accordance with the invention comprises a first ion source 10 producing a first ion beam 11 from a sample of a substance to be analysed, and a second ion source 20 producing a second ion beam 21 from a reference substance. The ion beams 11 and 21 are accelerated from the sources 10 and 20 by accelerating voltages from respective supplies 17 and 18 which may be a single power unit having two different voltage outputs. Both the ion beams 11 and 21 are directed through a common magnetic analyser 30, the ion beam 11 previously passing through an electrostatic analyser 12. The magnetic field within the magnetic analyser 30 is undergoing a scanning variation and causes deflection of ions in the ion beams 11 and 21 in known manner according to their mass to charge ratios. The ion sources 10 and 20, and the electrostatic analyser 12 are so arranged that the planes in which the ion beams 11 and 21 are deflected within the magnetic analyser 30 are substantially coincident. This arrangement provides the advantage of having a reference substance analysed in substantially the same field as the sample.

After its deflection in, and passage through the magnetic analyser 30, the ion beam 11 passes through a collector slit 13 and a retarding slip 14 to an electron multiplier 15. The output of the multiplier 15 is amplified in a pre-amplifier 16 and subsequently utilised in known manner to provide a mass spectrum of the substance to be analysed. At the same time, after its deflection in and passage through the magnetic analyser 30, the ion beam 21 passes through an electrostatic analyser 23, and a collector slit 24 to an electron multiplier 25. The output of the multiplier 25 is amplified in a pre-amplifier 26 and subsequently utilised in known manner to provide a mass spectrum of the reference substance which is utilised for mass number of calibration (mass marking) of the mass spectrum of the sample substance.

The retarding slit 14, which is maintained at a suitable potential (a positive potential for positive ions), functions to reject ions from the ion source 20, which is operated at an ion accelerating voltage substantially exceeding that at which the ion source 10 is operated, and thereby to ensure that the ion collector receives only ions from the first ion source 10. Similarly the second electrostatic analyser 23 functions as an energy filter to prevent ions from the first ion source 10 reaching the second ion collector. (The arrangement of FIG. 1, apart from the supplies 17 and 18, and possibly the pre-amplifiers 16 and 26, will be enclosed in a highly evacuated vacuum-tight envelope, as is well known in the art. For the sake of clarity, the envelope is not shown).

An an alternative to employing the retarding slit 14 as an energy filter, it is possible to employ a further electrostatic sector, or a Daly collector (For details of the Daly collector, reference should be made to a United Kingdom Pat. Specification No. 1171700). Similarly, a Daly collector may be used in place of the second electrostatic analyser 23.

Other forms of energy filtering may be employed within the scope of the invention to ensure proper discrimination between ions from different sources.

Figure 2:
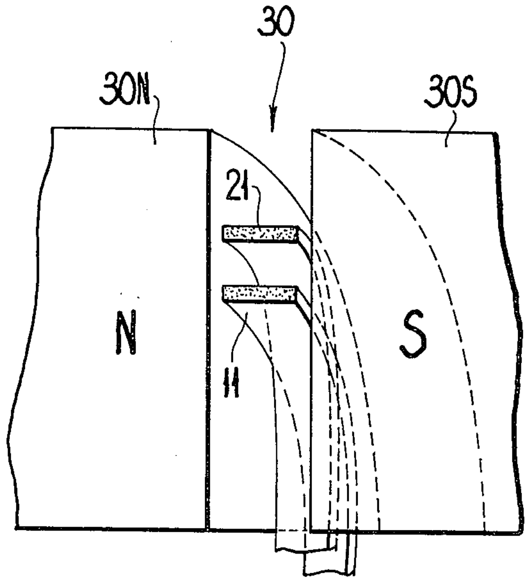
FIG. 2 is a fragmentary perspective view showing part of FIG. 1 diagrammatically and to an enlarged scale.

As shown in FIGS. 1 and 2, the ion beams 11 and 21 cross in the magnetic analyser 30. If it were arranged that the ion beams travelled within the magnetic analyser 30 on non-intersecting paths, such as parallel paths, and an ion-impermeable barrier placed between the ion beams, the above described energy filters would not be necessary.

Ions from the beam 11 may be collected at the maximum resolution of which the mass spectrometer is capable, high resolution being requied principally for the separation of doublets in an unknown substance. The ion beam 21, formed from a reference substance, can be collected at a lower resolution, since there are generally no doublets present.

By using a suitable ion discriminating device the ion beam 11 can be collected at high rsolution even when the ion source 10 is operating at a low ion accelerating potential.

Figure 3:
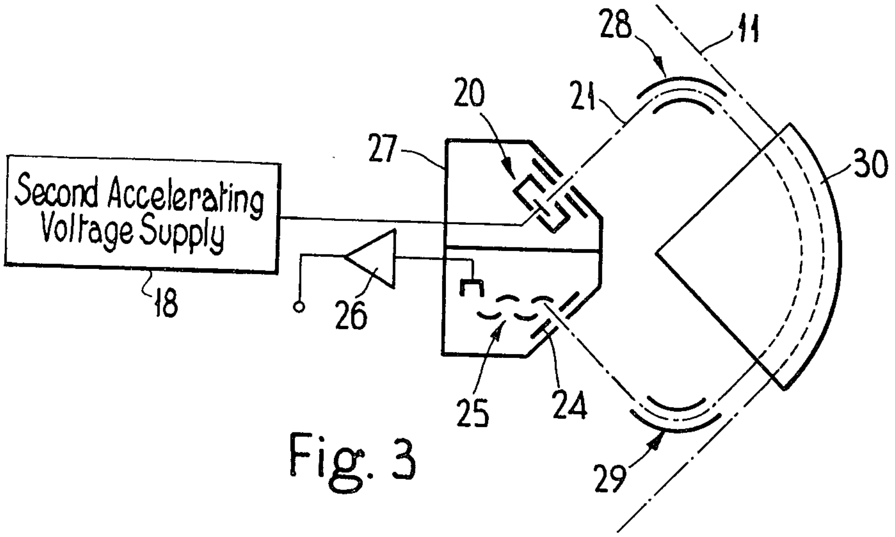
FIG. 3 is a schematic plan of part of an alternative arrangement to that of FIG. 1.

Referring now to FIG. 3, there is shown part of an alternative arrangement to that of FIG. 1 in which, for convenience, the same reference numerals have been used as in FIG. 1 for similar items. The source 20 and the multiplier 25 for the ion beam 21 are arranged in a common mounting block 27. An electrostatic analyser 28 deflects the ion beam 21 into the magnetic analyser 30 wherein it follows a path parallel to the ion beam 11. (The ion source 10 etc., of FIG. 1 have been omitted from FIG. 3). Another electrostatic analyser 29 deflects the ion beam 21 as it leaves the magnetic analyser 30 through the collector slit 24 and onto the electron multiplier 25. The analysers 28 and 29 provide energy filtering, and can be arranged to give some energy focusing of the ions in the ion beam 21. The analysers 28 and 29 also provide a convenient way of enabling removal of the collector for the second ion beam from the vicinity of the first ion beam.

An ion-impermeable barrier (not shown) may be interposed between the ion beams 11 and 21 in the FIG. 3 arrangement.

Figure 4:
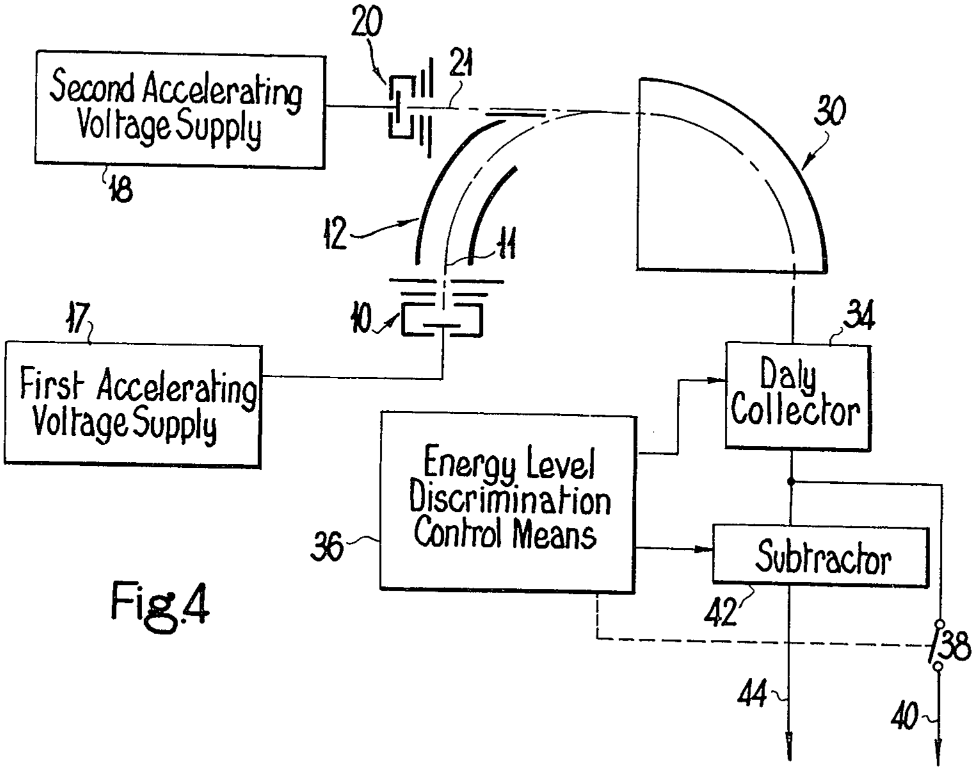
FIG. 4 is a schematic plan of part of a further alternative arranement to that of FIG. 1.

Referring now to FIG. 4, there is shown a still further alternative arrangement to that of FIG. 1. The ion sources 10 and 20, and the electrostatic analyser 12 are rearranged in relation to the magnetic analyser 30 such that the ion beams 11 and 21 are directed along a common path before they enter the analyser 30.

A single Daly collector 34 is arranged to collect ions which pass through the analyser 30. In order to distinguish between collected ions from different sources 10 and 20, their respective accelerating voltage supplies 17 and 18 (which were in FIG. 1 set to give substantially different accelerating voltage) are set to give accelerating voltages which differ by approximately 0.7% of the mean of the two voltages. Thus, with conventional accelerating voltages, this difference is of the order of 50 volts.

The small difference in accelerating potentials enables both ion beams to pass through the mass spectrometer together, but the difference is sufficiently large for the Daly collector 34 readily to distinguish between ions of the two slightly different energies. An energy level discrimination control means 36 rapidly switches the discrimination level of the collector 34 between about twenty five volts above and below the highest of the voltages supplied by the supplies 17 and 18. Th switching rate is very much higher than the scan rate of the field in the analyser 30, and can for example be around 25 kHz.

The output of the Daly collector 34 thereby alternates rapidly between the combined instantaneous portions of both of the mass spectra being scanned, and the same portion of the spectrum of ions accelerated by the lower of the accelerating voltages only. By synchronously operating a switch 38, the latter spectrum may be separated from the output of the collector 34 to appear on an output lead 40. To obtain the other spectrum, a subtractor 42 is synchronously operated to subtract the output signals produced during one of the sensitivities of the collector 34 from the output signals produced during the other sensitivity, i.e. the signals representing the spectrum appearing on the output lead 40 are subtracted from the signals repesenting the combined spectra. This may readily be accomplished, by for example, performing a sample and hold operation on the signal representing the combined spectrum during one period, and subtracting from this the signal received during the next period. Since these periods are very short owing to the rapid switching performed by the control means 36, effective subtraction is performed despite the continuous variation of the magnetic field in the analyser 30. Thereby the other spectrum appears on an output lead 44.

As an alternative to the switch 38 and the subtractor 42, the output of the Daly collector 34 may be fed to a digital computer (after suitable processing, as for example in an analogue to digital converter), the computer being programmed to take account of the switching between discrimination levels.

In previously described chemical mass marking, the unknown and reference spectra have substantially the same mass scales, i.e. peaks occurring simultaneously in both mass spectra have the same mass number. (Such chemical mass marking is exemplified by one mode of operation of the MS 30.) This principle may be extended, in accordance with the present invention, to enable accomplishment of accurate chemical mass marking of mass spectra extending to mass numbers very much higher than the highest reference mass number, without extrapolation.

With any of the mass spectrometer configurations shown in FIGS. 1, 3 or 4, the supply 17 may be set to provide an ion accelerating voltage of 2 kv, and the supply 18 set to provide an ion accelerating voltage of 8 kv. This means that at any time during a scan of the magnetic analyser 30, ions will be collected with a mass to charge ratio M/e which have originated from the ion source 20 simultaneously with the collection of ions of a mass to charge ratio 4M/e which have originated from the ion source 10 (M being any arbitrary mass number). Thus with perfluorokersene as the reference substance providing reference ion peaks up to about 1000 a.m.u., substances of up to 4000 a.m.u. can be analysed with accurate mass marking. In other words the two mass spectra (i.e. unknown and reference) are correlated in inverse relationship to the respective accelerating voltages. Similarly, with an even lower accelerating voltage for ions from the source 10, e.g. of 1 kv, spectra of unknown substances up to 8000 a.m.u. can be mass marked.

Despite the very high energy differences between the two ion beams, the Daly collector can still function to discriminate between the beams. Thus the FIG. 4 arrangement will still work as previously described when used for extended scale mass marking.

The same principle can be applied in reverse, i.e. with a low accelerating voltage for the reference ions and a high accelerating voltage for ions of the substance to be analyzed, a compressed reference spectrum is produced. With the above described exemplary accelerating voltages reversed, spectra of unknown substances may be mass marked on scales of 250 a.m.u. and 125 a.m.u. respectively (with perfluorokerosene as reference). This has the advantage of enabling very accurate mass marking in suitable conditions, as well as effectively shortening the distance along the mass scale of the unknown substance between reference peaks, i.e. it is effectively equivalent to increasing the number of reference peaks subject to the limitation of a relatively low upper limit to the mss numbers of unknown substances that can be mass marked in this manner.

In performing this extended (or compressed) scale mass marking, it is not necessary to have the ion beams coplanar, and the arrangement of FIG. 1 can be modified to have the ion beams 11 and 21 deflected in parallel planes. Any plural beam mass spectrometer having a magnetic sector can be adapted to perform extended scale mass marking, except those having a common energy filtering section (such as the electrostatic analyser of the MS 30) where of course only one ion beam would pass through the energy filter.

The mass spectrometers described with reference to the drawings may be suitably adapted MS 9's or MS 902's, as sold by AEI Scientific Apparatus Limited, or other mass spectrometers of similar ion beam geometry.

What is claimed is:

1. A method of mass spectrometry comprising the steps of forming ions from a substance to be analyzed in a first ion source and accelerating the ions therefrom at a first accelerating voltage to form a first ion beam, forming ions in a range of masses from a reference substance in a second ion source and accelerating the ions therefrom at a second accelerating voltage substantially different from the first accelerating voltage to form a second ion beam, directing the first and second ion beams into a magnetic analyzer having a varying magnetic field thereby to deflect the ions in both the beams according to their respective accelerating potentials and mass to charge ratios, making a scanning variation of said magnetic field, simultaneously collecting deflected ions from the respective beams which have passed through the analyzer, the ions collected at any time from both beams being ions having substantially like products of their respective accelerating voltages times their respective mass charge ratios and the ions collected at such time from one beam having substantially different masses than ions from the other beam, and producing a first mass spectrum of the substance to be analyzed and a second mass spectrum of the reference substance, the first and second mass spectra having substantially different mass scales which are correlated and in inverse relationship to the first and second accelerating voltages, whereby to provide accurate chemical mass marking of the first mass spectrum by the second mass spectrum.

2. The method of claim 1 including the further steps of collecting the ion beam or beams formed from the reference substance or substances at a low resolution and collecting the ion beam or ion beams formed from the substance or substances to be analyzed at a high resolution.

3. The method of claim 1 wherein at least one of the ion means is subjected to at least one electrostatic field arranged to cause double focusing of the respective ion beam.

4. The method of claim 1 wherein the ion beams are passed through the magnetic field along paths which intersect.

5. The method of claim 1 wherein the ion beams are passed through the magnetic field along paths which are parallel.

6. The method of claim 1 wherein the ion beams are passed along a common path at least immediately before deflection.

7. The method of claim 1 including the step of energy filtering the ions after analysis and prior to their collection.

8. The method of claim 7 wherein the analyzed ions are collected by a single ion collector which is capable of energy discrimination, and which is switched between levels of energy discrimination at a relatively high rate compared to the variation of the magnetic field whereby to produce an output distinguishing between collected ions from different ion beams.

9. The method of claim 1 wherein one of the accelerating voltages is at least twice the other accelerating voltage.

10. The method of claim 1 wherein the second accelerating voltage is substantially greater than the first accelerating voltage whereby the mass scale of the first mass spectrum is substantially greater than the mass scale of the second mass spectrum.

11. The method of claim 1 wherein only the first ion beam is electrostatically analyzed before passing through the magnetic field.

12. The method of claim 1 wherein the deflected ions are collected by a single ion collector means capable of producing an output representative of collected ions below a predetermind and controllably variable energy level, and switching the collector means between a first level above the energy level of ions accelerated by the higher of the accelerating voltages and a second level below the energy level of ions accelerated by the higher of the accelerating voltages but above the energy level of ions accelerated by the lower of the accelerating voltages, the switching being performed at a substantially greater rate than the rate of variation of the magnetic field, whereby the output of the collector means at the first level is representative of the first and second mass spectra superimposed, and the output at the second level is representative of the mass spectrum of ions accelerated by the lower of the accelerating voltages.

13. The method of claim 12 wherein the output at the second level is subtracted from the output at the first level to provide the mass spectrum of the ions accelerated by the higher of the accelerating voltages.

14. The method of claim 12 wherein the difference between the first and second levels corresponds to not substantially more than 0.7% of the higher of the accelerating voltages.

15. A mass spectrometer comprising means to create a variable magnetic field in a given direction, source means to establish at least two ion beams each containing ions in a range of masses and to accelerate the respective beams with different potentials thereby to pass said beams through said field for deflection along different curved paths which are substantially in a common plane, and means for collecting from each of the deflected ion beams, the ions collected from one beam at any given time being of masses different than ions collected from the other beam but the ions collected at such given time being of substantially only a single product of the respective accelerating voltages times the respective mass to charge ratios to produce respective mass spectra as the field varies.

16. The mass spectrometer of claim 15 further comprising a plurality of independently operable ion sources, one for each ion beam.

17. The mass spectrometer of claim 15 wherein the means for separately collecting the ion beams is capable of collecting different ones of the ion beams at substantially differing resolutions.

18. The mass spectrometer of claim 15 including means to give the ions of different beams substantially differing energies, and energy filtering means arranged immediately preceding the means for collecting the deflected ion beams, whereby each means for collecting a given ion beam substantially excludes ions from each other ion beam.

19. The mass spectrometer of claim 15 wherein at least one electrostatic analyzer is individually associated with one of the ion beams, such that the one ion beam is double focused in use.

20. The mass spectrometer of claim 15 wherein the means to pass the ion beams through the magnetic field causes the beams to intersect in the field.

21. The mass spectrometer of claim 15 wherein the means to pass the ion beams through the magnetic field causes the beams to follow non-intersecting paths in the field.

22. The mass spectrometer of claim 21 including an ion impermeable barrier between the non-intersecting ion beam paths.

23. The mass spectrometer of claim 15 including means to give the ions of different beams substantially differing energies, and energy filtering means forming part of the means for collecting the deflected ion beams, whereby each means for collecting a given ion beam substantially excludes ions from each other ion beam.

24. A mass spectrometer comprising a first ion source to form ions which have a range of masses from a substance to be analyzed, a second ion source to form ions which have a range of masses from a reference substance, means to accelerate ions from the first ion source at a first accelerating voltage to form a first ion beam, means to accelerate ions from the second ion source at a second accelerating voltage substantially different from the first accelerating voltage, to form a second ion beam, magnetic analyzer means to create a variable magnetic field, ion beam directing means to direct the first and second ion beams through said field to deflect ions in the beams according to their mass to charge ratios, and ion collector means arranged to collect ions from each beam which have passed through the magnetic analyzer, the ions collected from the first beam at any given time having substantially the same accelerating potential mass charge ratio product as ions collected from the second beam at such time and said ions from the first beam collected at said time having masses substantially different than those collected from the second beam at said time.

25. The mass spectrometer of claim 24 further comprising an electrostatic analyzer arranged to perform an electrostatic analysis of only the first ion beam before the beams enter the magnetic analyzer.

26. The mass spectrometer of claim 24 wherein the ion beams pass along a common path before entering the magnetic analyzer, the ion collector means comprises a single ion collector assembly capable of conrollable discrimination between collected ions of different energy levels, and further including control means to control the discrimination between levels at which respectively ions from one of the beams are collected, and ions from both of the beams are collected.

27. A double beam mass spectrometer comprising a first ion source to produce a first ion beam containing ions in a first range of masses, a second ion source to produce a second ion beam containing ions in a second range of masses, a first ion accelerating voltage supply to accelerate said first ion beam out of said first ion source along a first ion path, a second ion accelerating voltage supply to accelerate said second ion beam out of said second ion source along a second ion path, a common variable magnetic analyzer disposed about both said first and second ion paths to apply a variable magnetic field to both said first and second ion beams, said analyzer separating at any given time ions having like accelerating voltage times mass charge ratio products, the ions separated from the first beam at said time being of mass different than those separated from the second beam, a first ion collector means disposed on said first ion path to collect ions from said first ion beam after passing through said magnetic analyzer, a second ion collector means disposed on said second ion path to collect ions from said second ion beam after passing through said magnetic analyzer, a first ion energy discriminating means disposed about said first ion path between said first ion source and said magnetic analyzer to pass only monoenergetic ions from said first ion source to said magnetic analyzer, a second ion energy discriminating means disposed about said first ion path between said magnetic analyzer and said first ion collector means to pass only ions from said first ion source to said first ion collector means, and a third ion energy discriminating means disposed about said second ion path between said magnetic analyzer and said second ion collector means to pass only ions from said second ion source to said second ion collector means.

28. The mass spectrometer of claim 27, wherein said first and third ion energy discriminating means are electrostatic energy analyzers.

29. The mass spectrometer of claim 27 wherein said second ion energy discriminating means is an ion retarding slit means.

30. A double beam mass spectrometer comprising a first ion source to produce a first ion beam containing ions in a first range of masses, a second ion source to produce a second ion beam containing ions in a second range of masses, a first ion accelerating voltage supply to accelerate said first ion beam out of said first ion source along a first ion path, a second ion and different accelerating voltage supply to accelerate said second ion beam out of said second ion source along a second ion path, a common variable magnetic analyzer disposed about both said first and second ion paths to apply a variable magnetic field to both said first and second ion beams, said analyzer separating at any given time ions having like accelerating voltage times mass charge ratio products, the ions separated from the first beam at said time being of mass different than those separated from the second beam, a first ion collector means disposed on said first ion path to collect ions from said first ion beam after passing through said magnetic analyzer, a second ion collector means disposed on said second ion path to collect ions from said second ion beam after passing through said magnetic analyzer, a common mounting means mounting both said second ion source and said second ion collector means, a first ion beam deflector disposed about said second ion path between said second ion source and said magnetic analyzer to deflect said second ion beam from said second ion source into said magnetic analyzer, a second ion beam deflector disposed about said second ion path between said magnetic analyzer and said second ion collector means to deflect said second ion beam from said magnetic analyzer onto said second ion collector means, and ion discrimination means to prevent ions from said first ion source reaching said second ion collector means and to prevent ions from said second source reaching said first ion collector means.

31. The mass spectrometer of claim 30 wherein said ion discrimination means comprises an ion-impermeable barrier disposed between said first ion path and said second ion path.

32. The mass spectrometer of claim 30 wherein said ion discrimination means comprises ion energy discrimination means disposed about said first and second ion paths between said magnetic analyzer and said first and second ion collector means.

33. A mass spectrometer comprising a first ion source to produce a first ion beam containing ions in a first range of masses from a first substance, a second ion source to produce a second ion beam containing ions in a second range of masses from a second substance, said first source providing a first ion accelerating voltage supply to accelerate said first ion beam out of said first ion source, said second source providing a second and different ion accelerating voltage supply to accelerate said second ion beam out of said second ion source, a common variable magnetic analyzer, said analyzer separating at any given time ions of like product of their respective accelerating potentials times their respective mass charge ratios but the ions separated from the first beam at said time being of mass different than those separated from the second beam, a single ion energy discriminating ion collector means, and ion beam deflector means to deflect said first and second ion beams along a common ion path through said common variable magnetic analyzer and onto said single ion collector means.

34. A double-focusing mass spectrometer comprising:

a. an analyzer region composed of an electrostatic and a magnetic analyzer;

b. a first ion source positioned to emit ions to pass through both the electrostatic and the magnetic analyzer;

c. a second ion source positioned to emit ions from a reference substance to pass through the magnetic analyzer;

d. a collector means positioned to receive ions from both sources after they have passed through the magnetic analyzer; and, e. a potential conrol means connected to said sources to provide ion accelerating potentials to the two sources in a predetermined relationship with the potential of one of the sources being substantially greater than the potential of the other of the sources whereby peaks of certain masses from a reference substance will be focused on said collector means by the magnetic analyzer substantially concurrently with ion peaks from ions of different masses emitted from said first source and whereby said substantially concurrently focused peaks are formed from ions whose respective products of accelerating potential times mass charge ratio are substantially equal.

35. A method of mass spectrometry comprising the steps of forming ions from a substance to be analyzed in a first ion souce and accelerating the ions therefrom at a first accelerating voltage to form a first ion beam, forming ions in a range of masses from a reference substance in a second ion source and accelerating the ions therefrom at a second accelerating voltage substantially different from the first accelerating voltage to form a second ion beam, directing the ion beams through the analyzer of a mass spectrometer and scanning the mass spectrum of the ion beams to deflect the ions in both the beams, simultaneously collectng deflected ions from the respective beams which have passed through the analyzer, the ions collected at any given time from both beams bein ions of substantially like product of their respective accelerating potential times their respective mass charge ratios but the ions collected from said first ion beam at said time having masses substantially different than the masses of ions from the second beam at such time, and producing a first mass spectrum of the substance to be analyzed and a second mass spectrum of the reference substance.

36. A method of mass spectrometry comprising the steps of:

a. forming ions from a substance to be analyzed in a first ion source and accelerating the ions therefrom at a first accelerating voltage to form a first ion beam;

b. forming ions in a range of masses from a reference substance in a second ion source and accelerating the ions therefrom at a second accelerating voltage which is different from the first accelerating voltage by not substantially more than 0.7% of the first accelerating voltage;

c. directing the ion beams into a magnetic analyzer having a varying magnetic field thereby to deflect the ions in both beams according to their respective accelerating potentials and mass to charge ratios;

d. making a scanning variation of said magnetic field as the beams are passing through the analyzer;

e. collecting deflected ions from both the first and second ion beams which have passed through the analyzer by a single ion collector means capable of producing an output representative of collected ions below a predetermined, controllable and selectable energy level;

f. the ions collected at any time from both beams being ions having substantially like products of their respective accelerating voltages times their respective mass to charge ratios and the ions collected at such time from one beam having different masses than ions from the other beam; and, g. switching the collector means between a first level above the energy level of ions accelerated by the higher of the accelerating voltages and a second level below the energy level of ions accelerated by the higher of the accelerating voltages but above the energy level of ions accelerated by the lower of the accelerating voltages, the switching being performed at a substantially greater rate than the rate of variation of the magnetic field, whereby the output of the collector means at the first level is representative of the first and second mass spectra superimposed, and the output at the second level is representative of the mass spectrum of ions accelerated by the lower of the accelerating voltages.

* * * * *

UNITED STATES PATENT AND TRADEMARK OFFICE

CERTIFICATE OF CORRECTION

PATENT NO. : 3,950,641

DATED : April 13, 1976

INVENTOR(S) : Sydney Evans and Thomas Oliver Merren

It is certified that error appears in the above-identified patent and that said Letters Patent are hereby corrected as shown below:

Column 1, line 26, after "thereby" insert following - - producing points from which the mass numbers of the peaks - -

Column 1, line 65, "bein" should be - - being - -

Column 3, line 6, after "coincident." and before "This" insert the following sentence which begins a new paragraph: - - Figure 2 shows to an enlarged scale a perspective view showing diagrammatically the passage of the ion beams 11 and 21 between the poles 30N and 30S of the magnetic analyser 30. - -

Column 11, claim 35, line 2, "bein" should be - - being - -

Signed and Sealed this

Twenty-first Day of September 1976

[SEAL]

*Attest:*

RUTH C. MASON
*Attesting Officer*

C. MARSHALL DANN
*Commissioner of Patents and Trademarks*